United States Patent [19]

Haasl et al.

[11] Patent Number: 5,192,608
[45] Date of Patent: Mar. 9, 1993

[54] VINYL BASED COATINGS

[75] Inventors: Scott Haasl, Coon Rapids; Mark Kenow, Circle Pines, both of Minn.

[73] Assignee: PDI, Inc., Circle Pines, Minn.

[21] Appl. No.: 781,861

[22] Filed: Oct. 24, 1991

[51] Int. Cl.[5] ............... B32B 27/00; B32B 27/22; B32B 27/30
[52] U.S. Cl. .................. 428/319.7; 428/314.4; 428/314.8
[58] Field of Search ............. 428/319.7, 314.4, 314.8

[56] References Cited

U.S. PATENT DOCUMENTS

| | | | |
|---|---|---|---|
| 2,461,613 | 2/1949 | Quarles et al. | 260/33.2 |
| 2,668,801 | 2/1954 | Schultz | 260/318 |
| 3,035,004 | 5/1962 | Glavis | 260/29.7 |
| 3,169,088 | 2/1965 | Wetterau | 428/319.7 |
| 3,433,700 | 3/1969 | Migdol et al. | 428/319.7 |
| 3,549,404 | 12/1970 | Liberti | 117/26 |
| 4,046,587 | 9/1977 | Guglielmo, Sr. | 106/271 |
| 4,064,092 | 12/1977 | Burroway et al. | 260/29.6 PM |
| 4,097,440 | 6/1978 | Maximovich et al. | 260/31.4 |
| 4,192,787 | 3/1980 | Salmon | 260/21 |
| 4,206,255 | 6/1980 | Wenzel | 427/393.5 |
| 4,230,609 | 10/1980 | Burroway et al. | 260/296 TA |
| 4,230,844 | 10/1990 | Chang et al. | 526/210 |
| 4,404,258 | 9/1983 | Loewrigkeit | 428/424.6 |
| 4,434,268 | 2/1984 | Doroszkowsky et al. | 524/520 |
| 4,634,730 | 1/1987 | Bogdany | 524/425 |
| 4,652,466 | 3/1987 | Thoma et al. | 427/244 |
| 5,021,290 | 6/1991 | Rowell | 428/319.3 |

Primary Examiner—Paul R. Michl
Assistant Examiner—LaVonda DeWitt
Attorney, Agent, or Firm—Haugen and Nikolai

[57] ABSTRACT

An improved composite coating system for coating foam resin articles, including a formulation for a base coat together with a formulation for a top coat which bonds while to the surface of the base coat to form the composite. The base coat formulation is a water-based vinyl resin together with a slow evaporating coalescent and plasticizer. The top coat utilizes a solvent-based vinyl resin together with aromatic and aliphatic solvents and plasticizers. Erucic acid base monoamides are utilized for achieving desirable slip properties in the finished top coating. In order to achieve the desirable properties of the composite coatings, the latex resin-based materials are selected from those having a low glass transition temperature such as between −20° C. and about 20° C.

2 Claims, No Drawings

VINYL BASED COATINGS

BACKGROUND OF THE INVENTION

The present invention relates generally to an improved water-based vinyl latex base coat resin coating formulation together with a top coat formulation which is adapted for use therewith. More particularly, the present invention relates to a water-based vinyl resin containing film former which may be applied to a variety of surfaces, particularly foam resin articles, through a variety of application techniques or systems, with the film forming formulations being capable of forming a thick durable base coat with highly desirable adherent and coherent properties along with a top coat which improves overall durability of the composite coating. The uncured base coat material is reasonably viscous and highly adherent to surfaces upon which it is applied, properties which it retains while in the liquid state. Once the base coat material has been applied and permitted to cure, the residual thick coating or film possesses sufficiently high cohesive strength so as to render the dried film extremely tough and durable, and with sufficiently high adhesive strength so as to render the coating resistant to peel or other premature failure or release. When the base-coat material has been permitted to dry or otherwise cure through reaction and solvent (water) removal, a durable, pliable, flexible, and yet tough coating is created. This material cures uniformly and the coating is created without premature surface curing or skinning which would otherwise impede the loss of excess solvent from an uncured core. The top coat component, when applied to the base coat, provides a more glossy surface coating, and also adds to the durability of the coated article by adhering or otherwise bonding firmly to the base coat so as to provide it with added slip and toughness, as well as improving the water resistance. The top coat formulation, when added to the base coat, has also proven to enhance the weatherability of the overall coating as well as that of the coated article.

In addition to the improved properties of the coating, the formulations of the present invention have been found to reduce the emissions of volatile organic compounds (VOC) by amounts ranging from between 50% and 90%. This reduction in emission of VOC is achieved without sacrificing the appearance and/or quality of products coated with the improved formulations. Indeed, the appearance and quality of products coated with the formulations of the present invention are equal in most respects to those with solvent-based formulations.

The coating material of the present invention has been found highly adaptable for application to flexible articles, particularly articles fabricated from plastic, including plastic in foam form. Of particular interest are foam articles utilized in the sports industry, including floatation devices as well as body protection devices fabricated from foam and utilized as foam mats for wrestling and/or gymnastics, as well as foam knee pads and foam elbow pads.

It is recognized that the requirements of the state, local and federal EPA authorities, as well as compliance with OSHA regulations has increased interest in industry with water-base coatings. More restrictive conditions are being placed upon discharge of solvent vapors into the atmosphere, inasmuch as certain, but not all, solvents have been found to be health risks. When dealing with the coating of foam articles, solvent-base coatings tend to form anomalies in the foam article, including deformation of the foam structure and accordingly deformation of the substrate. While water-based systems have been recognized as representing a solution to the emissions and substrate deformation problems, water-based coating systems have generally not achieved the properties available from most solvent-based systems. The formulations of the base coat and top coat composites of the present invention, while water-based, create base coats and top coat composites which possess many of the properties previously only available in solvent-based systems.

The formulations of the present invention producing the composite coating has been found to reduce the frictional characteristics between the surface of the article and the athlete's body. Because of the improved durability and improved water resistance, the articles are easily cleaned with water or mild detergents and/or solvents.

Application techniques for the base coat, while in liquid form, are wide and varied, and may include dipping, brush application, or spray application. Relatively thick base coatings may be prepared from a single dipping operation, and viscosity control may accommodate the preparation of coatings of from as thin as about 2 mils but preferably greater, such as from about 8 mils up to about 12 to 15 mils. Base coats having such a thickness may be created using an operation as simple as a single dipping of the article into a supply of the formulation.

In the preparation of conventional coating formulations, particularly base coat formulations, it is generally desired that the film forming layer, particularly when in cured form, have appropriately designed and matched adhesive and cohesive properties. The physical and mechanical properties of the substrate may also be a factor in the design of the adhesive and cohesive properties of the base coat. Normally, these properties are tailored so that the bond which is formed by the adhesive material preferably fails due to simultaneous failure of both its adhesive and its cohesive properties. At the same time, it is generally desirable that the film possess a relatively high peel strength and that this property not be sacrificed in the pursuit of appropriate adhesive and cohesive strength. The formulations of the present invention are designed to possess high adhesive and cohesive strength so as to provide for coating and/or film durability along with appropriately high peel strength. Additional features of the formulations of the present invention include the characteristic of preparing reliable coatings through dipping of foam plastic articles, thereby facilitating the coating of these otherwise difficult-to-coat articles with a durable, pliable, flexible and tough film.

The desirable physical properties, particularly the adhesive quality of the formulations of the base coat of the present invention appear to make dip-coating operations possible. By way of example, the consistency of the liquid base coat material permits application in either single or multiple dip operations, with a thick and durable film being prepared. While films having such properties are particularly desirable for the coating of plastic foam articles, the formulations of the present invention are also useful as film formers for coating other articles as well, including rigid metallic articles and the like. Films and coatings formed in accordance with the present invention retain their good physical properties, including flexibility and durability, over extended periods of time and even while subjected to low temperatures.

The dual and composite coatings of the present invention have wide application to form coatings for objects fabricated from polyvinylchloride, vinyl/nitrile, polyethylene, including polyethylene foam in lineal, radiated cross-linked and/or chemically cross-linked form, polypropylene, polypropylene foam, polyurethane foam, expanded polystyrene (styrofoam), and the like.

SUMMARY OF THE INVENTION

The formulations of the present invention accordingly have wide utility as film forming materials to prepare relatively thick water-based vinyl latex resin base coatings in a single or multiple application, along with a highly compatible top coat. The base coat may be formulated so as to permit application by single or multiple dipping as well as by brushing, knife coating, or application with a roller or pad. Because of the wide variety of useful application techniques including dipping, and particularly because of the extremely high adhesive and cohesive strength of the base coat, and because of the desirable surface characteristics and base coat enhancement achieved with the top coat, the formulations find wide usage and application. Certain distinctions in the properties of individual formulations may determine the application technique desired, with these distinctions being based primarily upon differences in the adhesive solids content and viscosity. In-mold coating applications may also be considered.

In actual use, the base coat formulations of the present invention are normally applied to the surface to be coated prior to the removal of the water from the water-based solvent, or while the film forming formulations remain rich in water. Previously primed surfaces may be advantageously coated by formulations of the present invention as well. In either instance, the adhesive strength of the bonds which are formed with the film are sufficiently high so as to provide a firm solid bond with the surfaces being coated. Alternatively, the film forming formulation may be permitted to evaporate under normal ambient conditions, or expedited through the use of drying devices such as ovens and/or fans. Upon loss of the excess water solvent, the film forming formulation dries and a tough coating is formed with a substantially dry outer surface. This coating is improved through enhancement of the water resistance, resistance to skinning, as well as an increase in the cohesive strength through the application of the top coat formulation thereto.

Because of the good surface bonding and cohesive properties of base coat and top coat formulations of the present invention, the formulations are particularly useful for coating objects which may be frequently deformed during use, either through compression, deflection, or otherwise. Articles such as toys, buoyancy equipment, various articles designed for use in sports, athletics, or gymnastics, including padding, as well as other similar articles are frequently fabricated of plastic foam. The formulations of the present invention cure to form a film which is flexible in nature, but which nevertheless possesses the ability to retain its good adhesive and cohesive properties even when made relatively thick. The surface of the cured composite films neither attracts dirt nor does it trap embedded dirt or other solid particles. The films do not readily transfer from the surface to which initially bonded once drying and/or curing is substantially complete. The coatings have further desirable properties including the ability to withstand limited exposure to water, including water containing solutes such as detergents, solvents or the like. Thus, the material may be applied to the surfaces of swimming pool articles which can thereafter be utilized without undergoing rapid deterioration of the integrity of the coating. When the formulations are applied to the surfaces to form a relatively thick coating in a single application or operation, the resultant bulk coating remains both tough and durable, while maintaining its good adherent and coherent properties. Because of these physical properties, the material also finds use in connection with packaging of medical equipment, recreational and sporting goods, novelty items, upholstery, furniture, as well as general flotation equipment.

Briefly, in accordance with the present invention, a water-based solvent formulation of vinyl resin film forming solids is prepared, with the solids consisting generally of a mixture of vinyl chloride materials, along with one or more rheology modifiers. In addition, water-based adhesive tackifiers having low softening points may be added. A vinyl chloride-vinyl acetate copolymer resin top coat is useful in enhancing the already good physical properties of the coating. Typically, a top coat containing vinyl chloride-vinyl acetate copolymer resin solids may be applied over the cured base coat, with the top coat having, in addition to the copolymer resin, typical additives, including solvents, plasticizers, stabilizers including UV light stabilizers. Also, components are added to improve the slip or frictional properties of the exposed surface, and UV light stabilizers and defoamers are also preferably incorporated in the formulation.

By way of further explanation, the following general formulations have been found useful:

| BASE COATING | | |
|---|---|---|
| Component | Generic Description | Weight % Range |
| Vinyl chloride copolymer latex | plasticized copolymer film former in water solvent | 60% to 94% |
| Butyl acetate | solvent for fast acting coalescent | 4% to 12% |
| N-methyl pyrrolidone | slow evaporating coalescent | 0% to 4% |
| Butylbenzyl phthalate | plasticizer | 1% to 5% |
| Water and other additives | solvent, surfactants, defoamers, and thickeners | balance. |

Each of the components as set forth hereinabove in the base coating are commercially available.

| VINYL CHLORIDE-VINYL ACETATE COPOLYMER TOP COATING | | |
|---|---|---|
| Component | Generic Description | Weight % Range |
| Vinyl chloride-vinyl acetate resin solids in solvent | film former | 5% to 15% |
| Solvents including xylene, methyl-ethyl ketone, methyl isobutyl ketone | aromatic and aliphatic solvents | 70% to 90% |
| polyester and phthalate | plasticizers for | 5% to 15%. |

-continued

VINYL CHLORIDE-VINYL ACETATE COPOLYMER TOP COATING

| Component | Generic Description | Weight % Range |
|---|---|---|
| ester plasticizers | formulation | |

The formulation for the top coating includes components which are believed to cause the outer surface or skin of the base coating to respond so as to create an improved interface between the two coatings. Indeed, the bonding strength between the two coatings is firm, sound, and durable.

Therefore, it is a primary object of the present invention to provide an improved vinyl chloride base and top coating formulations wherein the base coating has good adherent, coherent and bulk properties with unusually high adhesive strength for relatively thick base coatings, together with a top coating which enhances certain properties of the base coat while improving the water resistance and slip characteristics of the finished composite coating.

It is yet a further object of the present invention to provide an improved vinyl chloride copolymer base coating formulation which utilizes water as a solvent, and which adheres well to a variety of substrate surfaces and which provides a highly adherent bond to such surfaces upon drying.

Yet a further object of the present invention is to provide a vinyl-based base coating formulation which is capable of forming relatively thick coatings and suitable for application to the surface of the article through dipping or other readily available means.

It is yet a further object of the present invention to provide an improved vinyl chloride copolymer based top coating formulation which is capable of forming a highly adherent bond to a previously prepared water-base, vinyl base substrate coating formulation, with the composite coatings providing uniform films which are highly adaptable for use in coating foam articles for applications requiring tolerance to severe impact as protective articles for athletics, and also for withstanding immersion in water.

Other and further objects of the present invention will become apparent to those skilled in the art upon a study of the following specification and appended claims.

DESCRIPTION OF THE PREFERRED EMBODIMENT

In order to better explain the features of the present invention, the following examples and formulations are given:

GENERAL EXAMPLE I

By way of general example, the following formulations are provided:

| BASE COAT | | |
|---|---|---|
| Component | Generic Description | Weight % Range |
| Plasticized vinyl chloride copolymer (plasticized with diethylhexyl phthalate), a synthetic latex containing 57% solids, balance water | Vinyl chloride copolymer | 82.26% |
| Surfactant-defoamer | Polyglycol silane | .18% |

-continued

| BASE COAT | | |
|---|---|---|
| Component | Generic Description | Weight % Range |
| N-butyl acetate | Ester-based solvent | 4.84% |
| Slow evaporating coalescent | N-methyl pyrrolidone | 2.67% |
| Acrylic-based emulsion | Acrylic-based emulsion containing acid carboxyl functional groups | .47% |
| Water | Used as solvent | balance. |

In addition, a plasticizer and/or flame retardant component may be utilized if desired to improve flexibility and flame retardant properties.

| TOP COAT | | |
|---|---|---|
| Component | Generic Description | Weight % Range |
| Vinyl chloride-vinyl acetate copolymer resin | A mixture of vinyl chloride-vinyl acetate | 10.43% |
| Xylene | Aromatic solvent | 38.89% |
| Methylethyl ketone | Aliphatic solvent | 35.08% |
| Methyl isobutyl ketone | Aliphatic solvent | 10.43% |
| Plasticizers, polyester-based | Polyester plasticizer | 1.94% |
| Phthalate ester Plasticizer | Phthalate esters | 1.48% |
| Plasticizer/stabilizer | Epoxidized soybean oil | .56% |
| Stabilizer | Alkyl tin maleate | .27% |
| Light stabilizer | A hindered amine | .13% |
| UV absorber/stabilizer | Hydroxybenzophenone | .07% |
| Unsaturated fatty monoamide derived from erucic acid | The unsaturated fatty monoamide of mono-ethenoid acid | .42% |
| Methyl alkyl polysiloxane copolymer for defoaming/slip properties | Methyl alkyl polysiloxane copolymer | .30. |

With respect to the individual components, each is commercially available. The following information is provided.

BASE COAT COMPONENTS

The preferred plasticized vinyl chloride copolymer (plasticized with diethylhexyl phthalate), is a synthetic latex containing 57% solids and manufactured by B. F. Goodrich of Cleveland, Ohio under the trade designation "GEON 576".

The preferred polyglycol functional silane, is a surfactant/defoamer manufactured by Air Products and Chemicals of Allentown, Pa. under the trade designation "Surfynol DF-58".

The ester-based solvent is preferably N-butyl acetate which is used as a fast evaporating coalescent to aid in film formation of the coating.

The cyclic amine, N-methyl pyrrolidone is used as a slow evaporating coalescent to aid in film formation at elevated temperatures.

The preferred acrylic based emulsion containing acid carboxyl functional groups which is used as a thickener, is the product manufactured by Rohm & Haas of Philadelphia, Pa. under the trade designation "Acrysol ASE95".

Butylbenzyl phthalate is a plasticizer that can be post-added to the base coat to improve the flexibility of the dried film of the base coat, such as that manufactured by Monsanto of Kenilworth, N.J. under the trade designation "Santicizer 160 Plasticizer". There are other materials which may function suitably as plasticizers for the base coat. These include certain phosphate esters such as isodecyl diphenyl phosphate, phthalate esters such as dioctyl phthalate, and polyester-based plasticizers. The latter are commonly referred to and known as polymeric plasticizers. Each plasticizer adds a special characteristic to the base coat, for example isodecyl diphenyl phosphate may be utilized for flame resistance.

A substitute is vinyl chloride copolymer latex containing 56% solids (plasticized with isodecyl diphenyl phosphate) for flame retardance manufactured by B. F. Goodrich of Cleveland, Ohio under the trade designation "GEON 577". This latex may be used in place of the plasticizer vinyl chloride copolymer to obtain special properties such as flame retardancy.

TOP COAT COMPONENTS

The vinyl chloride-vinyl acetate copolymer resin is manufactured by Union Carbide of Danbury, Conn. under the trade designation "VYNS-3".

The aromatic hydrocarbon for dissolving the vinyl resin portion of formulation is preferably xylene. The aliphatic material is a ketone which is used for dissolving the vinyl resin portion such as ethyl ketone or methyl isobutyl ketone.

The polyester-based plasticizer is manufactured by Argus of Brooklyn, N.Y. under the trade designation "Drapex P-1".

The phthalate ester plasticizer is manufactured by BASF of Parsippany, N.J. under the trade designation "Palitinol 711P". while the epoxidized soybean oil plasticizer/stabilizer is manufactured by Argus of Brooklyn, N.Y. under the trade designation "Drapex 6.8".

An alkyl tin maleate compound functions as a stabilizer and is manufactured by Argus of Brooklyn, N.Y. under the trade designation "Mark 275".

A suitable hindered amine light stabilizer is that manufactured by Ciba Geigy Corporation of Hawthorne, N.Y. under the trade designation "Tinuvin 292", while a hydroxybenzophenone UV absorber or light stabilizer is that manufactured by Argus of Brooklyn, N.Y. under the trade designation "Mark 1535".

Erucamide is an unsaturated fatty monoamide derived from erucic acid used for its slip properties, and is manufactured by Humko Chemical Division, Witco, of Memphis, Tenn. under the trade designation "Kemamide E". A polyether modified methylalkyl polysiloxane copolymer used for defoaming and slip properties such as that manufactured by BYK Chemie of Wallingford, Conn. under the trade designation "BYK-320".

The plasticizer component for the top coat has features in common with the plasticizer useful in the base coat. Plasticizers which appear to show promise in various formulations include: phosphate esters such as isodecyl diphenyl phosphate, phthalate esters such as dioctyl phthalate, and polyester-based plasticizers. The latter are commonly referred to and known as polymeric plasticizers. Each plasticizer adds a special characteristic to the base coat, for example isodecyl diphenyl phosphate may be utilized for flame resistance.

In addition to the above-indicated components, the following is a list of latex resins that may reasonably be employed in the formulation of the base coat:

Vinyl chloride/acrylic copolymer latex available from B. F. Goodrich Co. of Cleveland, Ohio under the following trade designations:

| Geon 576 | Geon 580X119 | Geon 574X43 |
| Geon 577 | Geon 580X178 | Geon 351 |
| Geon 590X20 | Geon 460X46 | Geon 352 |
| Geon 590X4 | Geon 460X60 | Geon 552 |
| | | Geon 151. |

These resins may be used in combination or admixture with each other or in combination with other suitable resins.

One feature of each of the latex components is their low glass transition temperatures, or alternatively, their ability to be post-plasticized to obtain low glass transition temperatures. In this connection, a low glass transition temperature is one which is within the range of between −20 degrees C. to about 20 degrees C.

As indicated hereinabove, the formulations for the base coat and top coat may be modified by those skilled in the art without departing from the actual scope of the present invention.

We claim:

1. Composite film forming formulation including a base coat formulation and a top coat formulation, wherein the working formulation for the base coat has the following formulation:

| Component | Generic Description | Weight % Range |
|---|---|---|
| Plasticized vinyl chloride copolymer (plasticized with diethylhexyl phthalate), a synthetic latex containing 57% solids, balance water | Vinyl chloride copolymer | 82.26% |
| Surfactant-defoamer | Polyglycol silane | .18% |
| N-butyl acetate | Ester-based solvent | 4.84% |
| Slow evaporating coalescent | N-methyl pyrrolidone | 2.67% |
| Acrylic-based emulsion | Acrylic-based emulsion containing acid carboxyl functional groups | .47% |
| Water | Used as solvent | balance; | and wherein the top coat formulation has the following composition:

| Component | Generic Description | Weight % Range |
|---|---|---|
| Vinyl chloride-vinyl acetate copolymer resin | A mixture of vinyl chloride-vinyl acetate | 10.43% |
| Xylene | Aromatic solvent | 38.89% |
| Methylethyl ketone | Aliphatic solvent | 35.08% |
| Methyl isobutyl ketone | Aliphatic solvent | 10.43% |
| Plasticizers, polyester-based | Polyester plasticizer | 1.94% |
| Phthalate ester Plasticizer | Phthalate esters | 1.48% |
| Plasticizer/stabilizer | Epoxidized soybean oil | .56% |
| Stabilizer | Alkyl tin maleate | .27% |
| Light stabilizer | A hindered amine | .13% |
| UV absorber/stabilizer | Hydroxybenzophenone | .07% |
| Unsaturated fatty monoamide derived from erucic acid | The unsaturated fatty monoamide of monoethenoid acid | .42% |
| Methyl alkyl polysiloxane copolymer for defoaming/slip properties | Methyl alkyl polysiloxane copolymer | .30. |

2. The method of applying a durable composite coating to a foam resin article which includes the steps of applying a base coating and a top coating to said article, and wherein the base coat has the following formulation:

| Component | Generic Description | Weight % Range |
|---|---|---|
| Plasticized vinyl chloride copolymer (plasticized with diethylhexyl phthalate), a synthetic latex containing 57% solids, balance water | Vinyl chloride copolymer | 82.26% |
| Surfactant-defoamer | Polyglycol silane | .18% |
| N-butyl acetate | Ester-based solvent | 4.84% |
| Slow evaporating coalescent | N-methyl pyrrolidone | 2.67% |
| Acrylic-based emulsion | Acrylic-based emulsion containing acid carboxyl functional groups | .47% |
| Water | Used as solvent | balance; | and wherein the top coat has the following formulation:

| Component | Generic Description | Weight % Range |
|---|---|---|
| Vinyl chloride-vinyl acetate copolymer resin | A mixture of vinyl chloride-vinyl acetate | 10.43% |
| Xylene | Aromatic solvent | 38.89% |
| Methylethyl ketone | Aliphatic solvent | 35.08% |
| Methyl isobutyl ketone | Aliphatic solvent | 10.43% |
| Plasticizers, polyester-based | Polyester plasticizer | 1.94% |
| Phthalate ester Plasticizer | Phthalate esters | 1.48% |
| Plasticizer/stabilizer | Epoxidized soybean oil | .56% |
| Stabilizer | Alkyl tin maleate | .27% |
| Light stabilizer | A hindered amine | .13% |
| UV absorber/stabilizer | Hydroxybenzophenone | .07% |
| Unsaturated fatty monoamide derived from erucic acid | The unsaturated fatty monoamide of monoethenoid acid | .42% |
| Methyl alkyl polysiloxane copolymer for defoaming/slip properties | Methyl alkyl polysiloxane copolymer | .30. |

* * * * *